Patented Sept. 29, 1925.

1,555,805

UNITED STATES PATENT OFFICE.

THILO KROEBER, OF WESTEND, NEAR BERLIN, GERMANY, ASSIGNOR, BY MESNE ASSIGNMENTS, TO N. V. INTERNATIONALE OXYGENIUM MAATSCHAPPIJ "NOVADEL," OF DEVENTER, NETHERLANDS.

COMMINUTED ORGANIC PEROXIDE AND PROCESS OF OBTAINING SAME.

No Drawing.   Application filed June 29, 1923.   Serial No. 648,575.

*To all whom it may concern:*

Be it known that I, THILO KROEBER, a citizen of Germany, residing at Westend, near Berlin, Germany, have invented certain new and useful Improvements in Comminuted Organic Peroxides and Processes of Obtaining Same, of which the following is a specification.

The present invention refers to a process for converting organic peroxides, especially benzoyl peroxide, into a finely divided state. The organic peroxides are among other purposes, used for bleaching solid or liquid substances, in which the peroxides are not soluble. For this purpose a very intimate mixture is required. Now the organic peroxides have the property that they can be comminuted with difficulty in the dry state because the organic peroxides tend to decompose at low temperatures. If the organic peroxides are comminuted in disintegrating machines, as for example, in grinding mills, an increase in temperature is inevitable and decomposition of some of the peroxide results, so that through the increased temperature, sintering takes place and the mass is partially decomposed.

Furthermore, when it is attempted to grind, certain of the organic peroxides do not crush into a fine powder, but are converted into plate-like pieces.

The present process consists in comminuting the organic peroxides in the presence of water or other liquid having no action upon organic peroxides, which liquid does not either decompose or dissolve any substantial amount of organic peroxides. The organic peroxides are mixed with the inactive liquid and the mixture is then subjected to a comminuting or grinding operation. By this procedure, a high state of division of the organic peroxides is obtained without decomposition. Hitherto the organic peroxides have been comminuted only in the dry state. The liquids used for the purpose herein are those in which the organic peroxides are practically insoluble, or not dissolved in a considerable degree.

If one grinds a mixture of organic peroxides with water, no evolution of oxygen or disassociation takes place, and a division can be obtained to very small grains or particles, even considerably below one micron (1/1000 millimeter.) The comminuted organic peroxides may then be easily and uniformly mixed with the materials to be bleached, whereby uniform bleaching to a desired extent may be easily obtained.

The process may be carried out for instance, by bringing into a cask or barrel as for instance, a wooden barrel (which has no action on the organic peroxides), having a capacity of 24 liters, 3 kilograms of benzoyl peroxides or dibenzaldi peroxide, 5 liters of water and 9 kilograms of balls of hard porcelain (of one size or of various sizes) or of any other hard material which will have no action on the peroxides. One subjects the barrel to a rotating action for a period of from 4 to 16 hours, according to the mixture of the peroxides and the fineness of the product desired, the rotation being at the rate of from 40 to 60 revolutions per hour.

During this operation, the whole mass of organic peroxides is converted into a light thin paste. The organic peroxides may be easily separated from the liquid by filtration, for instance, by a suction filter or by gas pressure over or through the mixture. By prolonging the grinding, a paste can be obtained which may be stored, even after the addition of water, for several hours.

Suitable liquids for carrying out this process are water, organic liquids unacted upon by organic peroxides, as for instance, benzol or cold alcohol. The grinding operation may be carried out at ordinary temperatures or below.

It will be seen that by this grinding process, I can reduce the particles to a grain size smaller than ordinary flour. In ordinary flour the size of the particles varies from about 20 to 60 microns.

I do not herein claim the bleaching of specific substances, by the use of the finely powdered peroxides produced in accordance with the present invention, such subject matter being claimed in a co-pending application Serial No. 26,787, filed April 29, 1925.

I claim:

1. A process for converting an organic crystalline peroxide into a finely divided state without decomposition, which comprises mixing the same with a liquid inactive toward the organic peroxide and grinding the same at a low temperature.

2. The process for converting benzoyl peroxide into a finely divided state which consists in mixing benzoyl peroxide with liquids inert thereto, and subjecting the mixture to a grinding and rubbing treatment.

3. The process for converting benzoyl peroxide into a finely divided state which consists in mixing benzoyl peroxide with a liquid chemically inactive thereupon and not a solvent therefor and subjecting the mixture to a grinding and rubbing operation for a period of from 4 to 16 hours.

4. The herein described new product comprising a mixture including an organic peroxide compound and a liquid which is inert thereto and which is a non-solvent thereof, a substantial portion of the said peroxide compound being in the form of particles considerably smaller than the average particles of ordinary flour.

5. An organic peroxide the bulk of which is comminuted to a grain size much finer than ordinary flour.

6. Benzoyl peroxide in the form of particles, a part of which particles are not substantially larger than one micron in size.

In testimony whereof I hereunto affix my signature.

THILO KROEBER.